United States Patent Office 3,782,973
Patented Jan. 1, 1974

3,782,973
FLAVORING COMPOSITIONS AND PROCESSES
Alan O. Pittet, Atlantic Highlands, and Eugene W. Seitz, Middletown, N.J., assignors to International Flavors & Fragrances Inc., New York, N.Y.
No Drawing. Continuation-in-part of application Ser. No. 69,505, Sept. 3, 1970. This application July 28, 1971, Ser. No. 166,971
The portion of the term of the patent subsequent to Aug. 29, 1989, has been disclaimed
Int. Cl. A23l 1/26
U.S. Cl. 426—175
18 Claims

ABSTRACT OF THE DISCLOSURE

Processes for the preparation of reaction products of cyclic ketones and sulfur-free amino acids; the reaction products so produced; use of the reaction products to alter the flavor and/or aroma of consumable materials; and compositions containing such reaction products adapted to alter the flavor and/or aroma of consumable materials.

RELATED APPLICATIONS

This application is a continuation-in-part of copending U.S. patent application 69,505, filed Sept. 3, 1970, now U.S. Pat. No. 3,687,692.

BACKGROUND OF THE INVENTION

The present invention relates to novel reaction products of cyclic ketones and sulfur-free amino acids and the processes for preparing them, the reaction products being useful in processes and compositions for altering the flavors and fragrances of foodstuffs.

Due to the tremendous consumption of foodstuffs, there has been an increasing interest in substances and methods for imparting flavors to foodstuffs. This interest has been stimulated not only because of the inadequate quantity of natural flavoring material available, but perhaps even more importantly, because of the need for materials which can combine several nuances, will be more stable than natural materials, will blend better with other flavors or flavoring composition components, and will generally provide superior products.

It has recently been suggested in Netherlands patent specification 6910102 that cooked meat aromas and flavors can be obtained by reacting heterocyclic ketones with hydrogen sulfide or another sulfur-containing compound. Organic sulfur-containing compounds suggested for use in the reaction include cysteine, cysteine-containing peptides such as glutathione and cysteine-thioacetamide, and other simple derivatives of cysteine.

In Schultz, Day, and Libbey, Chemistry and Physiology of Flavors, it is stated that Wiseblatt et al. (Cereal Chem. 40, 162) reacted dihydroxyacetone with proline and obtained a strong cracker-like aroma. Schultz et al. also note the incorporation by Hodge et al. (Cereal Chem. 38, 221) of maltol and isomaltol into baked products. A chapter in Advances in Heterocyclic Chemistry vol. 7, at page 463, recounts a finding by Ch. Eugster that 2,5-dimethyl-furan-3-one has an intense smell, similar to that of freshly baked bread.

THE INVENTION

It has been surprisingly found that certain non-sulfur-containing amino acids can be reacted with cyclic ketones as hereinafter described to provide reaction products having the odor and/or taste properties suggestive of baked goods, baked tubers, or chocolate and cocoa products. The reaction products are accordingly well-suited to the production of flavor and/or olfactory compositions and adapted to use in altering the flavors and/or aroma characteristics of a wide variety of consumable materials, as hereinafter disclosed.

More specifically, the reaction products are formed by heating one or more sulfur-free amino acids containing from five to about eight carbon atoms with at least one cyclic ketone according to the formula

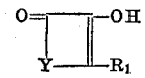

wherein $R_1$ is lower alkyl and Y is a substituted or unsubstituted two- or three-atom containing group, which can be saturated or unsaturated, comprising a portion of the ring. The cyclic ketone can be homocyclic or heterocyclic, the preferred hetero atom being oxygen.

It will be appreciated from the present disclosure that the cyclic ketones are furan derivatives, pyrone derivatives, and cyclopentenyl derivatives. Accordingly, in certain preferred embodiments of the invention Y in the above formula is —$CHR_2$—$CHR_3$—, —CH=CH—O—, or $CHR_2$—O— where $R_2$ and $R_3$ are hydrogen or lower alkyl. While in some instances the lower alkyl groups substituent on the cyclic ketones can contain up to six carbon atoms, $R_1$ is preferably methyl, ethyl, or propyl, $R_2$ is preferably methyl or hydrogen, and $R_3$ is preferably hydrogen.

The cyclic ketones utilized herein can also be referred to as cyclic diketones or cyclic α-diketones. They are in many instances capable of existing in either their keto or their enol forms. Thus, a preferred cyclic ketones in the present invention is Cyclotene (I) (2-hydroxy-3-methyl-2-cyclopenten-1-one) which can also be considered to be 3-methylcyclopentan-1,2-dione, thus

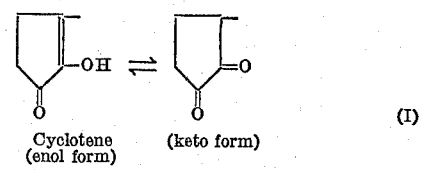

Cyclotene (enol form)    (keto form)    (I)

For convenience herein, the materials will be referred to as cyclic ketones.

The cyclic ketones desirably used herein are generally known compounds, and such are commercially available. In addition to the Cyclotene mentioned above, the ketones include Ethyl Cyclotene (3-ethyl-2-hydroxy-2-cyclopentan-1-one)

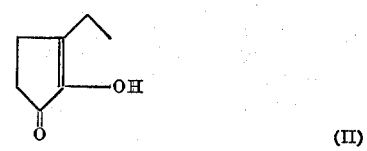

(II)

2-hydroxy-3-propyl-2-cyclopenten-1-one

(III)

maltol (2-methyl-3-hydroxy-1,4-pyrone)

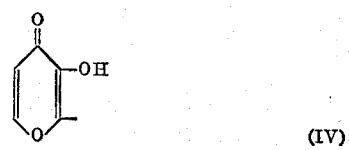

(IV)

ethyl maltol (2-ethyl-3-hydroxy-1,4-pyrone)

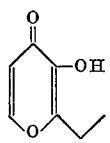
(V)

4-hydroxy-5-methyl-2H-furan-3-one

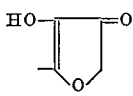
(VI)

and 4-hydroxy-2,5-dimethyl-2H-furan-3-one

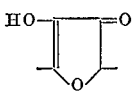
(VII)

The preferred cyclic ketones in certain aspects of this invention include the hydroxyfuranones such as (VI) and (VII), and dialkyl hydroxyfuranones, such as (VII); 4-hydroxy-2,5-diethyl - 2H - furan-3-one; and the like are particularly preferred in some aspects.

The sulfur-free amino acids used herein contain from five to about eight carbon atoms in the molecule and can be aliphatic or cyclic. Preferred sulfur-free amino acids accordingly include valine (2-amino-3-methylbutanoic acid), leucine (2-amino-4-methylpentanoic acid), proline (2-pyrrolidine carboxylic acid):

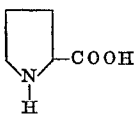

and hydroxyproline (more specifically, 4-hydroxy-2-pyrrolidinecarboxylic acid):

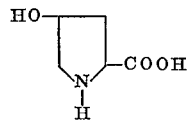

It will be noted that the foregoing preferred acids all have the nitrogen group on the carbon alpha to the carboxylic acid carbonyl carbons.

The amino acids utilized herein can exhibit optical isomerism due to the presence of an asymmetric carbon atom. The term sulfur-free amino acid will be taken to include the dextrorotatory form, the levorotatory form, a mixture of these in any proportions, including an optically undifferentiated racemic form.

It has further been found that mixtures of sulfur-free amino acids, peptides, or proteins which contain such sulfur-free amino acids can also be used in the practice of the invention. In fact, mixtures of one or more amino acids and one or more cyclic ketones can be used to create a wide range of sweet, cream, milk, bread, baked goods, and chocolate flavors and aromas. Subtle nuances can accordingly be obtained for altering flavors and/or aromas, as more fully disclosed below. It has been found, for example, that grades of gelatin, being relatively low in sulful-containing amino acids, can be used as a source of the sulfur-free amino acids. This is apparently possible because gelatin contains only small quantities of sulfur-containing amino acids (about 0.1% of cysteine and cystine together) and contains large quantities of proline (18%) and hydroxyproline (14%) together with lesser quantities of leucine and valine.

Reaction product means the product produced by means of a chemical reaction between one or more cyclic ketones and one or more sulfur-free amino acids. The reaction product can be formed prior to addition to the material, of which the aroma and/or flavor character is to be altered, or a product produced in situ by separate addition, or by addition in non-reacted condition of each of the reactants (e.g., proline and cyclotene) to the material.

The reaction is desirably carried out in a temperature range of 50° C. to 250° C. with a temperature of 100° C. to 150° C. being preferred. The sulfur-free amino acid is used in amounts sufficient to yield on a mole basis with respect to the cyclic ketone a ratio of 0.1 to 20, with a range of 0.5 to 5 being preferred.

The temperature is maintained as indicated above for a period of time sufficient to provide a good flavor and aroma, but not long enough to permit the formation of off-flavors and/or aromas. It will be understood from the present description that a flavor can be developed in the reaction product during shorter times at high temperatures than are required at lower temperatures. The time can be varied from as little as two or three minutes up to two hours. It is preferred to produce the pleasantly odoriferous and tasty reaction product in times of about five minutes to 30 minutes.

The reaction can be carried out at atmospheric, subatmospheric, or superatmospheric pressures. It is generally desirable to carry out the heating to form the reaction product at pressures in the range of 0.5 to 50 atmospheres. Preferred pressures are from one to 20 atmospheres.

To promote good contact between the cyclic ketone and sulfur-free amino acid as well as good heat transfer, and moderation of the reaction, it is preferred to carry out the reaction in a liquid vehicle, preferably a food grade vehicle, such as a triglyceride oil like cooking oil, shortening and similar fats, polyhydric materials such as propylene glycol, glycerol, and the like or water and the like. Mixtures of vehicles can be used. It is additionally desirable that the food-grade vehicle also act as a solvent for the reaction product, this being found to maximize retention of the more volatile components present in the reaction medium which components might otherwise be lost. The reaction product is preferably provided in the form of a solution, to facilitate its use in precise quantities in the foodstuff or flavoring composition.

Thus, the present invention provides for providing various sweet, milk, rich creamy, chocolate, baked goods, toasted cheese, buttery, baked potato flavors and/or aromas. The reaction products can be used for direct addition to consumable materials such as comestibles, tobaccos, perfumes, and the like, as components of flavoring and olfactory compositions, and to enhance, vary, alter, modify, or improve the flavors and/or aromas of a wide variety of consumable materials. The term "alter" in its various forms is accordingly used herein to mean supplying or imparting a flavor or fragrance character or note to an otherwise bland, relatively tasteless or odorless substance or composition, augmenting the existing flavor characteristic where a natural flavor is deficient in some regard, or supplementing the existing flavor or olfactory impression to modify its quality, character, odor, or taste.

The term "foodstuff" as used herein includes both solid and liquid ingestible materials for man and animal, which materials usually do, but need not, have nutritional value. Thus, foodstuffs include dairy products such as butter, milk, cream and the like, breadstuffs, crackers, popcorn, cereal products, pretzels, sweeteners capable of supplying light, fruity caramel, toffee-like flavor notes, maple, honey, baked potato, milk chocolate, toasted cheese, and sweet scorched flavor and aroma notes. Thus, such foodstuffs may be provided in the form of convenience foods, beverages, candies, cereals, soft drinks, snacks, dog and cat foods, other veterinary products and the like.

In accordance with one aspect of the invention relating to use for flavoring foodstuffs, it has been found that a composition containing a reaction product obtained by treating at elevated temperature a mixture of sulfur-free amino acid and at least one cyclic ketone is capable of imparting a wide variety of organoleptic characteristics to foodstuffs including the lengthening of the time that the foodstuff has an acceptable flavor. The reaction products are particularly valuable as an additive for reproducing the flavor and aroma characteristics of cereal, such as cereals derived from wheat, rice and the like, crackers, rice, popcorn, baked potato, and the like, supplying certain desirable fatty toasted notes normaly missing in heated, i.e., lightly browned, butter, buterscotch and the like. Depending in part upon the concentration of the reaction product, the sulfur-free amino acid used, and the type of cyclic ketone precursor employed, the reaction product can be used to supply sweet, honey-like aroma and flavor notes, such as is characteristic of Graham crackers, or sweet burnt notes reminiscent of the toasted sweet notes of bread crumbs frying in butter at the foaming-up stage before it has subsided and burned, milk chocolate, toasted cheese, baked potato or light fruity notes such as caramel, maple and the like, and flavor notes having a definite sweet milk cream character. The product is particularly useful in flavoring breadstuffs and in imparting baked goods aroma to paper products used for packaging baked goods such as bread.

The term breadstuffs as used herein means any of the dough or dough-like products including without limitation, bread, cake, rolls, biscuits, crackers, cookies, muffins and the like.

The cyclic ketones described for use herein are further advantageous in that they possess, per se, appealing flavor characteristics and thus, may be allowed to remain in the reaction product mixture, thereby obviating any necessity for separation and recovery of the reaction product in pure form and thus eliminating the associated cost which might otherwise accrue. Thus, the unreacted cyclic ketone blends with the flavor of the reaction product to provide an effective flavoring additive.

When the reaction products of this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners and flavor intensifiers.

Such conventional flavoring materials include saturated, unsaturated, fatty and amino acids; alcohols, including primary and secondary alcohols; esters; carbonyl compounds including ketones and aldehydes; lactones, other cyclic organic materials including benzene derivatives, alicyclics, heterocyclics such as furans, pyridines, pyrazines and the like or derivatives thereof; proteins; lipids; carbohydrates; so-called flavor potentiators such as monosodium glutamate, guanylates, and inosinates; natural flavoring materials; essential oils and extracts; artificial flavoring materials; and the like.

Stabilizers include preservatives such as sodium chloride, and the like, antioxidants such as calcium and sodium ascorbate, ascorbic acid, butylated hydroxyanisole, butylated hydroxytoluene, propyl gallate, and the like, sequestrants such as citric acid, ethylenediamine tetraacetic acid, phosphates, and the like.

Thickeners include materials such as carriers, binders, protective colloids, suspending agent emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches, and pectins.

Surface active agents include emulsifying agents such as mono- and/or diglycerides of fatty acids such as capric acid, caprlyic acid, palmitic acid, stearic acid, oleic acid, myristic acid, linolenic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcumin and the like; firming agents such as aluminum sodium sulfate, calcium chloride and calcium gluconate; texturizers; anti-caking agents such as aluminum calcium sulfate and tribasic calcium phosphate; enzymes; yeast foods such as calcium lactate and calcium sulfate; nutrient supplements such as iron salts such as ferric phosphate, ferric pyrophosphate, ferrous gluconate and the like, riboflavin, vitamins, zinc sources such as zinc chloride, zinc sulfate, and the like.

The reaction products or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenen, other gums, and the like. The reaction product can be incorporated with the carriers by conventional means such as spray-drying, drum-drying, and the like. Such carriers can also include materials for coacervating the reaction products of the present invention (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the reaction product can be added to the materials to be flavored at any convenient point in the production of the finished product. Thus, when the reaction product is used to alter or otherwise vary the flavor of a foodstuff, it can be added in the original mixture, dough, emulsion, batter, natural product, or the like prior to any cooking or heating operation. Alternatively, it can be added at a later stage of processing if volatilization losses would be excessive during the earlier processing. The quantity of reaction product utilized should be sufficient to impart the desired flavor characteristic to the product, but on the other hand, the use of an excessive amount of such reaction products is not only wasteful and uneconomic, but too large a quantity unbalances the flavor of the product consumed. Moreover, at too high a level in flavoring compositions (and also in foodstuffs) the pleasant food character of the reaction product can be lost.

The quantity used will vary depending upon the ultimate foodstuff, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer. Accordingly, the terminology "effective amount" and "sufficient amount" is understood in the context of the present invention to be quantitatively adequate to alter the flavor and/or aroma of the foodstuff, tobacco, or other consumable material.

In accordance with the present invention, it is desirable that the ultimate composition contain from 0.5 to about 2000 p.p.m. of reaction product. More particularly in food compositions it is preferred to use from about one to about 1500 p.p.m., and in certain greatly preferred embodiments of the invention, from about 3 p.p.m. to about 1000 p.p.m. of the reaction product. All parts, proportions, percentages, and ratios herein are by weight, unless otherwise indicated.

The reaction products of this invention are also useful individually or in admixtures as fragrances. They can be used to contribute a powerful caramel-like sweet "baked" fragrance. As olfactory agents, the reaction products of this invention can be formulated into or used as components of a "perfume composition."

A perfume composition is composed of a small but effective amount of a reaction product of this invention and an auxiliary perfume ingredient, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note or the "bouquet" or foundationstone of the composition: (b) modifiers which round-off and accompany the main note: (c) fixatives which include odorous substances which lend a particular note to the perfume throughout all stages of evaporation, and substances which retard evaporation and (d) topnotes which are usually low-boiling fresh smelling materials.

In perfume compositions the individual component will contribute its particular olfactory characteristics, but the overall effect of the perfume composition will be the sum of the effect of each ingredient. Thus, the individual reaction product of this invention, or mixtures thereof, can be used to alter the aroma characteristics of a perfume composition, for example, by high-lighting or moderating the olfactory reaction contributed by another ingredient in the composition.

The amount of the reaction product of this invention which will be effective in perfume compositions depends on many factors, including the other ingredients, their amounts and the effects which are desired. It has been found that perfume compositions containing as little as 2% of the compounds of this invention or even less, can be used to impart a sweet odor to soaps, cosmetics, and the other products. The amount employed can range up to 50% or higher and will depend on considerations of cost, nature of the end product, the effect desired on the finished product and the particular fragrance sought.

The reaction products of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screen powders such as talcs, dusting powders, face powder, and the like. When used as an olfactory component of a perfumed article, as little as 0.01% of one or more of the reaction product will suffice to impart powerful caramel-like sweet "baked" odor. Generally, no more than 0.3% is required.

In addition, the perfume composition or fragrance composition can contain a vehicle or carrier for the reaction product alone or with other ingredients. The vehicle can be a liquid such as alcohol, glycol, or the like. The carrier can be an absorbent solid such as a gum or components for encapsulating the composition.

It is well known in the tobacco art that the domestic tobaccos which are exemplified by burley, Maryland, fluecured, bright leaf or Virginia tobaccos are low in flavor as compared with so-called oriental or aromatic tobaccos which are imported from Turkey, Greece, Bulgaria, Yugoslavia, Rhodesia and Russia. Accordingly, it has been common practice in the tobacco industry to prepare blends of domestic and oriental tobaccos in order to provide cigarettes which have desired flavor and aroma characteristics. This invention also provides a tobacco which has an enhanced flavor and aroma.

Furthermore, this invention also provides a flavored replacement for tobacco, prepared by substituting for tobacco dried lettuce leaves, cabbage leaves and the like, and adding thereto a flavoring composition which contains one or more reaction products according to the invention. The reaction product or products of this invention are added to tobacco or imitation tobacco in amounts to provide generally a material in which is dispersed about 0.01 to about 1.0 percent by weight of the additive. Preferably the amount of additive is between about 0.05 and about 0.50 percent by weight in order to provide tobacco or imitation tobacco, having a desired flavor and aroma. The preferred percentages can be somewhat less, however, if other flavorants imparting a desired aroma are also employed.

The additives may be applied in any suitable manner and preferably in the form of a liquid solution or suspension by spraying, dipping or otherwise. The additives may be incorporated at any step in the treatment of the tobacco or imitation tobacco, but are preferably added after aging, curing and shredding and before the tobacco or dried lettuce leaves, cabbage leaves and the like is formed into tobacco, or imitation tobacco products such as cigarettes, cigars and the like. Alternatively, only a portion of the tobacco or imitation tobacco is treated and the thus treated tobacco, or imitation tobacco may be blended with other tobacco or tobacco-like materials to form the final product. In such cases, the tobacco, or imitation tobacco treated may have the additives in excess of amounts about indicated so that when blended with other tobaccos or tobacco-like materials the final product will have the percentage within the indicated range.

In exemplification of this invention, an aged, cured and shredded domestic burley togacco is sprayed with a two percent ethanol solution of the reaction product of proline and 4-hydroxy-2,5-dimethyl-2H-furan-3-one in an amount to provide a tobacco composition containing 0.005 percent by weight of the product on a dry basis. Thereafter the alcohol is removed by evaporation and the tobacco is manufactured into cigarettes by the usual techniques. The cigarette when treated as indicated has a desired and pleasing aroma which is detectable in the main and side smoke streams when the cigarette is smoked; and this aroma contains a desirable note described by some smokers as a fruity winelike note.

At lower concentrations the reaction products of this invention have been found to improve the overall natural flavor and aroma of Virginia tobacco, for example. It will be particularly apparent that the manner in which the reaction products of this invention are applied to the tobacco, or imitation tobacco is not particularly important since, as indicated, it may be done in the form of spraying or dipping, utilizing suitable suspensions or solutions of the reaction product. Thus, water or volatile organic solvents, such as alcohol, ether, propylene glycol, acetone, volatile hydrocarbons and the like may be used as the carrying medium for the additive while it is being applied to the tobacco, or imitation tobacco. Also, other flavor and aroma producing additives, such as those disclosed in Jones U.S. Pat. No. 2,978,365, may be incorporated into the tobacco or imitation tobacco with the additives of this invention.

While this invention is useful in the manufacture of cigarette tobacco, or imitation tobacco, it is also suitable for use in connection with the manufacture of pipe tobacco for use in connection with the manufacture of pipe tobacco, cigars and other tobacco products or imitation tobacco products formed from sheeted tobacco dust or fines or formed from ground dried lettuce leaves or cabbage leaves which are well known to the art. Likewise, the additives of the invention can be incorporated with materials such as filter tip materials, seam paste, packaging materials and the like which are used along with tobacco and imitation tobacco to form a product adapted for smoking. Where the reaction products of this invention are added to certain tobacco substitutes of natural or synthetic origin the term "tobacco" as used throughout this specification also is meant to include any composition intended for human consumption by smoking or otherwise, whether composed of tobacco plant parts or substitute materials or both.

The following examples are given to illustrate embodiments of the invention as it is presently preferred to practice it. It will be understood that these examples are illustrative, and the invention is not to be considered as restricted thereto except as indicated in the appended claims.

EXAMPLE I

A mixture comprising the following ingredients:

| Ingredient: | Amount (grams) |
| --- | --- |
| L-proline | 1.0 |
| 4-hydroxy-2,5-dimethyl-2(H)-furan-3-one | 1.0 |
| Cottonseed oil | 10.0 | was heated and stirred. The temperature rises to 125° C. over a ten-minute period, whereupon a slurry consisting of a clear yellow solution and a brown residue forms.

The odor of the slurry is reminiscent of Graham crackers, i.e., a sweet honey-like note and definite cracker note.

EXAMPLE II

A mixture comprising the following ingredients:

| Ingredient: | Amount (grams) |
| --- | --- |
| L-proline | 0.3 |
| 4-hydroxy-2,5-dimethyl-2(H)-furan-3-one | 0.3 |
| Shortening | 3.3 | was heated to 125° C. over a ten-minute period. The shortening melted and became golden yellow. The furan compound dissolved completely while the L-proline partially browned and partially dissolved.

The odor of the reaction product was reminiscent of bread.

EXAMPLE III

A mixture comprising the following ingredients:

| Ingredient: | Amount (grams) |
| --- | --- |
| L-proline | 1.0 |
| 4-hydroxy-2,5-dimethyl-2(H)-furan-3-one | 2.0 |
| Shortening | 20.0 | was blended until uniform and then heated in a conical flask from room temperature to 140° C. over a period of 15 minutes and held at this temperature for ten minutes.

There was obtained a slurry consisting of an orange-light brown solution with a considerable amount of sediment. The slurry possessed an aroma reminiscent of corn, although this note was weak. In addition, the slurry had a definite sweet flavor.

EXAMPLE IV

A mixture comprising of the following ingredients:

| Ingredient: | Amount (grams) |
| --- | --- |
| 4-hydroxy-2,5-dimethyl-2(H)-furan-3-one | 0.25 |
| L-proline | 2.0 |
| Propylene glycol | 20.0 | was heated in an Erlenmeyer flask. The furan compound rapidly dissolved and the L-proline material dissolved somewhat more slowly to yield a clear golden yellow solution. The temperature of the reaction mixture was raised to 105° C. for a period of five minutes and then the mixture was allowed to cool.

The reaction product was judged to have a good balance of corn and sweet-burnt notes.

EXAMPLE V

A mixture comprising the following ingredients:

| Ingredient: | Amount (grams) |
| --- | --- |
| L-proline | 2.0 |
| Propylene glycol | 25.0 | was blended together and heated in an Erlenmeyer flask on a hot plate. Initially, a colorless solution was obtained which changed to a light golden color on further heating. When the temperature had reached 145° C., 0.25 g. of 2,5-dimethyl-4-hydroxy-2H-furan-3-one was added and heating was stopped and the reaction mixture was transferred to a stoppered bottle.

The flavor of this mixture is judged to be slightly weaker than that of the product of Example IV with more cereal and corn notes.

EXAMPLE VI

A composition comprising the following ingredients:

| Ingredient: | Amount (grams) |
| --- | --- |
| Ethyl maltol | 0.3 |
| L-proline | 2.0 |
| Propylene glycol | 20.0 | was heated in an Erlenmeyer flask to 140° C. from 25° C. over a period of three minutes and maintained at 140° C. for an additional 2 minutes. The mixture was transferred to a stoppered bottle to cool. The material has a more burnt sugar character and is fruitier than the material of Example IV and possesses a distinctive cracker cereal note.

EXAMPLE VII

A composition comprising the following ingredients:

| Ingredient: | Amount (grams) |
| --- | --- |
| Maltol | 0.3 |
| L-proline | 2.0 |
| Propylene glycol | 20.0 | was heated from a temperature of 25° C. to a temperature of 170° C. in an Erlenmeyer flask over a period of 7 minutes and thereupon transferred to a bottle and stoppered.

The flavor has popcorn and cracker notes together with a sweet creamy milk character.

EXAMPLE VIII

A composition comprising the following ingredients:

| Ingredient: | Amount (grams) |
| --- | --- |
| Cyclotene | 0.25 |
| L-proline | 2.0 |
| Propylene glycol | 20.0 | was heated from a temperature of 25° C. to a temperature of 120° C. over a period of 7 minutes as described in Example VII.

The material has a sweet scorched burnt sugar note.

EXAMPLE IX

A composition comprising the following ingredients:

| Ingredient: | Amount (grams) |
| --- | --- |
| Ethyl cyclotene | 0.3 |
| L-proline | 2.0 |
| Propylene glycol | 20.0 | was heated from room temperature to a temperature of 155° C. over a period of about eight minutes. The material has caramel rum toffee-like notes and is heavier in total character than the reaction product of Example IV.

EXAMPLE X

A mixture comprising the following ingredients:

| Ingredient: | Amount (grams) |
| --- | --- |
| DL-leucine | 0.7 |
| 4-hydroxy-2,5-dimethyl-2(H)-furan-3-one | 0.7 |
| Propylene glycol | 28 | is heated at 155° C. over a 5-minute period and is maintained at this temperature for 5 minutes. Some solids are undissolved.

The odor of the resulting material is that of toasted cheese, buttery with background of chocolate.

EXAMPLE XI

A mixture comprising the following ingredients:

| Ingredient: | Amount (grams) |
|---|---|
| DL-valine | 0.5 |
| Maltol | 1.0 |
| Propylene glycol | 25 | is heated in an Erlenmeyer flask. The temperature rises from 28° to 150° C. over a period of ten minutes. The mixture is then transferred to a stoppered bottle to cool.

On cooling a white precipitate forms. The product has the flavor of milk chocolate.

EXAMPLE XII

A mixture comprising the following ingredients:

| Ingredient: | Amount (grams) |
|---|---|
| DL-valine | 0.5 |
| 4-hydroxy-2,5-dimethyl-2(H)-furan-3-one | 0.5 |
| Propylene glycol | 25 | is heated in an Erlenmeyer flask. The temperature rises from 28 to 130° C. over a period of 10 minutes. The mixture yields a clear golden yellow solution with an aroma of sweet baked goods. It is transferred to a bottle. Some precipitate forms on standing.

EXAMPLE XIII

A mixture comprising the following ingredients:

| Ingredient: | Amount (grams) |
|---|---|
| Gelatin | 0.75 |
| 4-hydroxy-2,5-dimethyl-2(H)-furan-3-one | 0.85 |
| Propylene glycol | 28 | is heated to 160° C. over a 7-minute periold yielding an amber gelatinous solution and a sweet cereal odor. The mixture is transferred to a bottle. The final precipitate has a roasted, baked potato flavor.

EXAMPLE XIV

A mixture comprising the following ingredients:

| Ingredient: | Amount (grams) |
|---|---|
| Gelatin | 1.25 |
| Maltol | 1.4 |
| Propylene glycol | 26 | is heated to 155° C. over a 5-minute period, and maintained at this temperature for five minutes. A thick viscous amber-colored solution is obtained.

The odor of the resulting material is like baked potato.

EXAMPLE XV

A mixture comprising the following ingredients:

| Ingredient: | Amount (grams) |
|---|---|
| Valine | 0.5 |
| Maltol | 1.0 |
| Glycerol | 25 | is heated to 150° C. over a period of 5 minutes. It yields a clear, almost colorless solution with a toasted note. The mixture is transferred to a bottle to cool and yields a thick opalescent suspension with a rich creamy milk chocolate odor.

EXAMPLE XVI

A mixture comprising the following ingredients:

| Ingredient: | Amount (grams) |
|---|---|
| Valine | 0.9 |
| 4-hydroxy-2,5-dimethyl-2(H)-furan-3-one | 0.6 |
| Propylene glycol | 50 | is placed in a Parr bomb and is heated under pressure for 10 minutes in an oil bath at 205° C. The bomb is then cooled and its contents transferred to a stoppered bottle. The clear orange amber product has an appetizing sweet milk aroma with some green notes.

When it is tasted at 500 p.p.m. in water it has a characteristic dark chocolate taste.

EXAMPLE XVII

A mixture comprising the following ingredients:

| Ingredient: | Amount (grams) |
|---|---|
| Leucine | 1.0 |
| Maltol | 1.0 |
| Propylene glycol | 60 | is placed in a Parr bomb and is heated under pressure for 10 minutes in an oil bath at 205° C. The bomb is then cooled and its contents transferred to a stoppered bottle. The light amber-colored product possesses an excellent chocolate flavor.

When it is tasted at 500 p.p.m. it has a milk chocolate taste; at 1500 p.p.m., it has a good chocolate taste and aroma.

EXAMPLE XVII

A mixture comprising the following ingredients:

| Ingredient: | Amount (grams) |
|---|---|
| Hydroxyproline | 0.9 |
| Maltol | 1.25 |
| Propylene glycol | 50 | is stirred and is heated to 150° C. over a 5-minute period and is maintained at this temperature for an additional minute. The solution turns brown and on cooling the product possesses a sweet nutty flavor with a back note of mustard.

When it is tasted at 500 p.p.m. in water it has a green vegetable character with sweet notes.

EXAMPLE XIX

A white bread dough mix is prepared by mixing 1350 g. wheat flour and 800 ml. water. To the mix is added:

| Ingredient: | Amount (grams) |
|---|---|
| Yeast | 27.0 |
| Sodium chloride | 27.0 |
| Sucrose | 67.5 |
| Shortening | 54 |
| Non-fat dry milk powder | 40.5 |
| Yeast food (Arkady; manufactured by Fleischmann, Div. of Standard Brands) | 0.50 |
| Softening agent (succinylated monoglycerides; manufactured by Kraft Div. of National Dairy Products Corporation) | 3.4 |

Six grams of the product obtained in Example II by reacting L-proline with 4-hydroxy-2,5-dimethyl-2(H)-furan-3-one are added to the dough. The dough is then mixed for 8 minutes and allowed to rise for 45 minutes at 40° C. The dough is then baked for 45 minutes at 210° C.

The breadstuff product obtained has a flavor note reminiscent of the crust of home made Italian bread and has acceptable and persistent flavor properties for a period of one week and has good flavor characteristics when spread with margarine.

By way of comparison, breadstuffs similarly prepared but omitting the sulfur-free amino acid-cyclic ketone reaction product have a flat taste, show typical flavor deterioration on storage during a period of one week, and require an expensive butter spread to provide an acceptable flavor.

Similar results are obtained when the foregoing example is repeated but employing in equivalent quantities the proline-cyclic diketone reaction products of Examples I and III through IX inclusive.

EXAMPLE XX

A lavender-type perfume composition is prepared by admixing the following ingredients:

| Ingredient: | Amount (parts) |
|---|---|
| Benzyl acetate | 50 |
| Bois de rose oil | 70 |
| Petitgrain oil | 30 |
| Terpinyl acetate | 100 |
| Spike lavender Spanish | 200 |
| Lavindin oil | 300 |
| Rosemary | 50 |
| Coumarin | 30 |
| Musk xylene | 40 |
| Oakmoss absolute, green | 40 |
| Vetivert oil bourbon | 50 |
| Reaction product of proline and ethyl maltol produced in Example VI | 2 |
| Diethyl phthalate | 68 |

The foregoing mixture is given a powerful caramel-like sweet "baked" base note because of the addition thereto of the two parts of proline-ethyl maltol reaction product produced by the process of Example VI.

EXAMPLE XXI

A butter flavor mixture comprising the following ingredients is prepared:

| Ingredient: | Amount (grams) |
|---|---|
| Propylene glycol | 85.025 |
| Benzaldehyde | 0.125 |
| Oil of lemon | 0.25 |
| Butyl butyryl lactate | 2.5 |
| Diacetyl | 3.0 |
| Ethyl butyrate | 4.0 |
| Butyric acid | 4.0 |
| Product obtained in Example IV | 0.3 |

The addition of the 0.3 part of L-proline-2,5-dimethylhydroxy-2(H)-furan-3-one reaction product changes the character of the flavor from "fresh" to "cooked lightly browned." If three parts of the reaction product is used in place of 0.3 part, the character of the flavor is described as "butterscotch."

EXAMPLE XXII

An imitation butter popcorn flavored concentrate containing the Cyclotene-proline reaction product produced in Example VIII in an amount of 0.6% by weight is formulated as follows:

| Ingredient: | Amount (parts) |
|---|---|
| Propylene glycol | 704.5 |
| 2-acetyl pyrazine | 0.5 |
| Benzilidene acetone | 3.0 |
| Cinnamic aldehyde | 4.0 |
| Heliotropin | 5.0 |
| Valeric acid | 6.0 |
| Cinnamyl butyrate | 9.0 |
| Ethyl butyrate | 10.0 |
| Benzodihydropyrone | 12.0 |
| Vanillin | 40.0 |
| Lactic acid | 50.0 |
| Butyric acid | 100.0 |
| Diacetyl | 50.0 |
| Reaction product of Example VIII | 6.0 |

EXAMPLE XXIII

A "corn chip" snack item is produced by spraying the solution of Example XIII onto a bland corn-based chip in order to give an approximate level of 0.04% by weight. The resulting product is then air-dried before testing by a flavor evaluation panel. A majority of the flavor evaluation panel prefers the treated chips for the buttered popcorn flavor and aroma.

EXAMPLE XXIV

The following is prepared:

| Ingredient: | Amount (parts) |
|---|---|
| Reaction product of Example IV | 2.0 |
| Benzaldehyde | 10.0 |
| Vanillin | 15.0 |
| Heliotropin | 0.5 |
| Cinnamyl aldehyde | 3.0 |
| β-Ionone | 5.0 |
| Coumarin | 5.0 |
| Propylene glycol | 59.5 |

This material is applied to shredded Virginia tobacco at the rate of 0.25%. The resulting mixture has a fruity, wine-like topnote with a heavier baked goods base note.

EXAMPLE XXV

A "Foin Coupe" perfume composition is preparted by admixing the following ingredients:

| Ingredient: | Amount (parts) |
|---|---|
| Acetophenone | 70 |
| Benzyl acetate | 70 |
| Linalool | 300 |
| Lavender | 150 |
| Bergamot oil | 40 |
| Sage sclaree, French | 20 |
| Geranium bourbon | 50 |
| Benzophenone | 50 |
| Musk xylol | 20 |
| Oakmoss absolute, green | 5 |
| Sandalwood oil | 15 |
| Patchouli oil, dark | 10 |
| Coumarin | 40 |
| Proline-ethyl maltol reaction product of Example VI | 2 |
| Diethyl phthalate | 150 |

The foregoing mixture is given a powerful caramel-like sweet "baked" topnote as a result of adding the two parts of the proline-ethyl maltol reaction product.

EXAMPLE XXVI

A chocolate flavor composition (A) is prepared by admixing the following ingredients:

| Ingredient: | Amount (parts) |
|---|---|
| Maltol | 3 |
| Vanillin | 12 |
| Ethyl vanillin | 4 |
| Diacetyl (10% in propylene glycol) | 1 |
| Dimethyl sulfide | 0.5 |
| Isobutylacetate | 0.2 |
| Isoamylacetate | 0.3 |
| Phenyl ethyl acetate | 1.0 |
| Furfuryl alcohol | 1.0 |
| Furfural (50% in propylene glycol) | 0.3 |
| Benzaldehyde | 0.7 |
| Phenylacetaldehyde | 0.5 |
| Isoamyl alcohol | 0.5 |
| Phenyl ethyl alcohol | 4.0 |
| γ-Butyrolactone | 9.0 |
| Isobutyraldehyde | 5.0 |
| Isovaleraldehyde | 10.0 |
| Propylene glycol | 47.0 |

A second chocolate flavor composition (B) is prepared by admixing the following ingredients:

| Ingredient: | Amount (parts) |
|---|---|
| Flavor composition (A) | 10 |
| Reaction product from Example XVI | 10 |
| Alcohol (95%) | 80 |

A third chocolate flavor composition (C) is prepared by admixing the following ingredients:

Ingredient: Amount (parts)
  Flavor composition (A) ---------------- 10
  Reaction product from Example XVII -------- 10
  Alcohol (95%) ------------------------- 80

Formulation D is prepared by admixing the following ingredients:

Ingredient: Amount (parts)
  Flavor composition (A) ---------------- 10
  Propylene glycol ---------------------- 10
  Alcohol (95%) ------------------------- 80

The formulations (B) and (C) both have much fuller and deeper chocolate taste than formulation (D) which lacks the flavor contribution of the reaction products of Examples XVI and XVII, respectively.

The taste imparted by the reaction product of Example XVI is a characteristic dark chocolate. The inclusion of the reaction product of Example XVII creates a very pleasant characteristic milk chocolate flavor.

We claim:

1. A composition for altering the flavor and/or aroma of consumable materials which comprises the reaction product obtained by heating at least one cyclic ketone having the formula

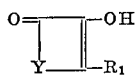

wherein $R_1$ is lower alkyl and Y is —$CHR_2$—$CHR_3$—, —$CHR_2$—O—, or —CH=CH—O—, and $R_2$ and $R_3$ are hydrogen or lower alkyl, with at least one sulfur-free alpha-amino acid having from five to eight carbon atoms in the molecule.

2. A composition according to claim 1 wherein $R_1$ contains from one to three carbon atoms and $R_2$ and $R_3$ are hydrogen or alkyl containing from one to three carbon atoms.

3. A composition according to claim 1 wherein the sulfur-free amino acid is leucine, valine, proline, hydroxyproline or a mixture of two or more such acids.

4. A composition according to claim 1 wherein the cyclic ketone is one wherein $R_1$ is methyl or ethyl when Y is —CH=CH—O—; $R_1$ is methyl and $R_2$ is methyl or hydrogen when Y is —$CHR_2$—O—; and $R_1$ is methyl, ethyl or propyl when Y is —$CH_2$—$CH_2$—; or a mixture containing at least two such ketones.

5. A process for the preparation of a composition according to claim 1 which comprises heating at least one cyclic ketone having the formula

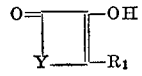

wherein $R_1$ is lower alkyl and Y is —$CHR_2$—$CHR_3$—, —$CHR_2$—O—, or —CH=CH—O—, and $R_2$ and $R_3$ are hydrogen or lower alkyl, with at least one sulfur-free alpha-amino acid having from five to eight carbon atoms in the molecule.

6. A process according to claim 5 wherein the heating is conducted at a temperature of from 50° to 250° C.

7. A process according to claim 5 wherein heating is carried out at a pressure of from 0.5 to 50 atmospheres.

8. A process according to claim 5 wherein the heating is carried out for a time of two minutes to two hours.

9. A process according to claim 5 wherein the mole ratio of sulfur-free amino acid to cyclic ketone is 0.1 to 20.

10. A process according to claim 5 wherein the heating is conducted in the presence of a neutral reaction vehicle.

11. A process according to claim 10 wherein the reaction vehicle is ingestibly acceptable.

12. A process for altering the flavor and/or aroma of a consumable material which comprises adding to said consumable material an effective amount of a composition prepared by heating at least one cyclic ketone having the formula

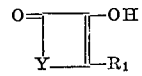

wherein $R_1$ is lower alkyl and Y is —$CHR_2$—$CHR_3$—, —$CHR_2$—O—, or —CH=CH—O—, and $R_2$ and $R_3$ are hydrogen or lower alkyl, with at least one sulfur-free alpha-amino acid, other than proline, having from five to eight carbon atoms in the molecule.

13. A process according to claim 12 wherein the consumable material is a foodstuff.

14. A process according to claim 12 wherein the consumable material is a perfume.

15. A process according to claim 12 wherein the consumable material is a tobacco product.

16. A composition for altering the flavor and/or aroma of consumable material which comprises the reaction product obtained by heating at least one cyclic ketone having the formula

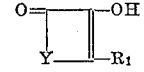

wherein $R_1$ is lower alkyl and Y is —$CHR_2$—$CHR_3$—, —$CHR_2$—O—, or —CH=CH—O, and $R_2$ and $R_3$ are hydrogen or lower alkyl, with gelatin.

17. A process for the preparation of a composition according to claim 16 which comprises heating at least one cyclic ketone having the formula

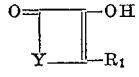

wherein $R_1$ is lower alkyl and Y is —$CHR_2$—$CHR_3$—, —$CHR_2$—O—, or —CH=CH—O, and $R_2$ and $R_3$ are hydrogen or lower alkyl, with gelatin.

18. A process for altering the flavor and/or aroma of a consumable material which comprises adding an effective amount of a composition prepared according to the process of claim 17.

References Cited
UNITED STATES PATENTS

| | | | |
|---|---|---|---|
| 2,934,435 | 4/1960 | May | 99—140 R |
| 3,268,555 | 8/1966 | Wiseblatt | 99—140 R |
| 3,547,659 | 12/1970 | Cort | 99—140 R |
| 3,620,771 | 11/1971 | Hunter | 99—140 R |
| 3,687,692 | 8/1972 | Pittet | 99—140 R |

MORRIS O. WOLK, Primary Examiner

S. MARANTZ, Assistant Examiner

U.S. Cl. X.R.

131—17, 144; 252—522; 426—201, 212

UNITED STATES PATENT OFFICE
CERTIFICATE OF CORRECTION

Patent No. 3,782,973      Dated January 1, 1974

Inventor(s) ALAN O. PITTET and EUGENE W. SEITZ

It is certified that error appears in the above-identified patent and that said Letters Patent are hereby corrected as shown below:

Col. 2, line 30, change "ketones" to --ketone--.

Col. 8, l. 65-66, delete "for use in connection with the manufacture of pipe tobacco".

Claim 5, penultimate line thereof, after "amino" and before "having" insert --acid--.

Signed and sealed this 16th day of April 1974.

(SEAL)
Attest:

EDWARD M. FLETCHER, JR.      C. MARSHALL DANN
Attesting Officer      Commissioner of Patents